(12) United States Patent
Newlin

(10) Patent No.: US 10,485,361 B2
(45) Date of Patent: Nov. 26, 2019

(54) RIGID JEWELRY DISPLAY PAD

(71) Applicant: Carol Newlin, Stillwater, NY (US)

(72) Inventor: Carol Newlin, Stillwater, NY (US)

( * ) Notice: Subject to any disclaimer, the term of this patent is extended or adjusted under 35 U.S.C. 154(b) by 0 days.

(21) Appl. No.: 16/020,293

(22) Filed: Jun. 27, 2018

(65) Prior Publication Data

US 2019/0075943 A1    Mar. 14, 2019

Related U.S. Application Data

(60) Provisional application No. 62/556,067, filed on Sep. 8, 2017.

(51) Int. Cl.
| | |
|---|---|
| *A47F 7/02* | (2006.01) |
| *B65H 54/68* | (2006.01) |
| *F16B 45/00* | (2006.01) |
| *F16B 2/08* | (2006.01) |
| *A45C 11/16* | (2006.01) |

(52) U.S. Cl.
CPC ............... *A47F 7/02* (2013.01); *A45C 11/16* (2013.01); *B65H 54/68* (2013.01); *F16B 2/08* (2013.01); *F16B 45/00* (2013.01)

(58) Field of Classification Search
CPC . A47F 7/02; A45C 11/16; B65H 54/68; F16B 45/00; F16B 2/08
USPC ........................................................ 206/495
See application file for complete search history.

*Primary Examiner* — Anthony D Stashick
*Assistant Examiner* — James M Van Buskirk

(57) ABSTRACT

The rigid jewelry display pad is an apparatus that effectively stores and organizes at least one necklace. The apparatus maintains the natural structure of the at least one necklace while secured onto the apparatus. The apparatus includes a rigid pad, a plurality of metal-mesh straps, a plurality of fasteners, a main strap, a main fastener, and at least one elastic band. The rigid pad upholds the at least one necklace and is covered with a layer of velvet. The rigid pad includes a first planar surface and a second planar surface. The at least one necklace is positioned and secured onto the first planar surface with the plurality of metal-mesh straps and the main strap with the plurality of fasteners and the main fastener, respectively. The at least one elastic band presses and secures any portion of the at least one necklace that is hanging against the second planar surface.

20 Claims, 5 Drawing Sheets

RIGID JEWELRY DISPLAY PAD

The current application claims priority to U.S. provisional application Ser. No. 62/556,067 filed on Sep. 8, 2017.

FIELD OF THE INVENTION

The present invention generally relates to jewelry pads. More specifically, the present invention is a rigid jewelry display pad that neatly secures at least one necklace.

BACKGROUND OF THE INVENTION

Big, chunky, statement necklaces are common and popular accessories that are difficult to pack for traveling. Current travel jewelry containers such as jewelry containers and jewelry rolls protect large necklaces but occupy too much space and do not effectively organize jewelry. Jewelry cases typically occupy too much space and the suitcase or travel pack of an individual wastes space as the jewelry case has empty space to accommodate varying types of jewelry. Jewelry rolls typically do no keep jewelry organized. Jewelry stored in jewelry rolls may be compartmentalized according to type of jewelry, however within each compartment, the jewelry gets tangled about each other. There is therefore a need for a jewelry container that effectively protects, stores, and organizes jewelry for traveling.

It is an objective of the present invention to protect and secure necklaces while occupying minimal space in a suitcase or similar traveling bag. The present invention is a solid, light-weight, velvet-covered pad for securing necklaces while preserving the natural structure of the necklace. The present invention utilizes flexible straps with magnetic fasteners. The flexible straps are adjustable in length as the straps themselves are metal and the magnetic fasteners may connect directly to the flexible strap itself. The present invention stores and protects both big, chunky necklaces as well as delicate and long necklaces. The overall structure of the present invention allows the present invention and the necklaces secured to the present invention to slip vertically into the side of a suitcase or similar travel bag.

DETAIL DESCRIPTIONS OF THE INVENTION

Figure 1:
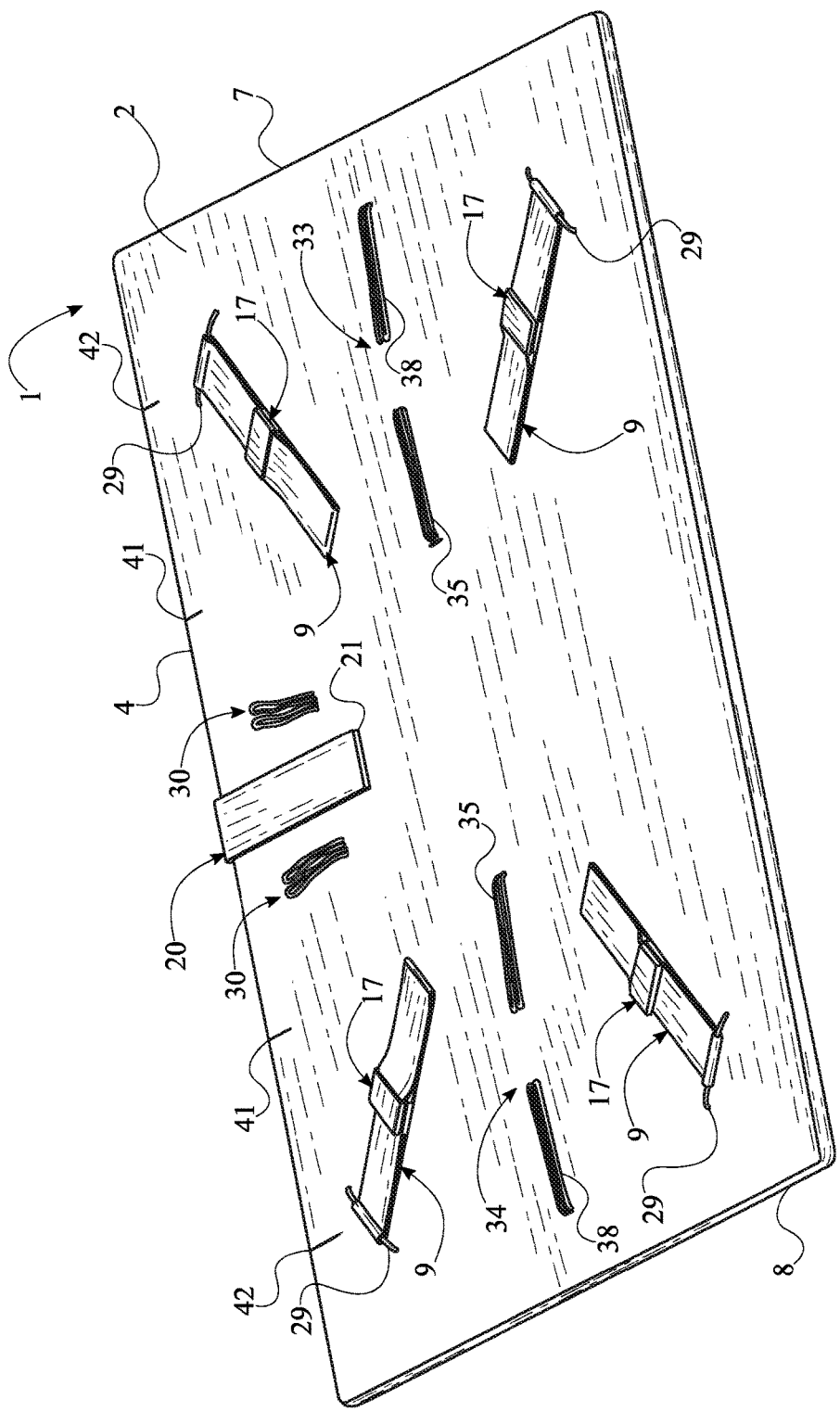
FIG. 1 is a perspective view of the present invention.

All illustrations of the drawings are for the purpose of describing selected versions of the present invention and are not intended to limit the scope of the present invention.

The present invention is a rigid jewelry display pad that effectively stores and organizes jewelry. More specifically, the present invention neatly stores and protects necklaces. The present invention maintains the natural structure of the necklaces while stored. In order for the present invention to effectively store, organize, and protect at least one necklace, the present invention comprises a rigid pad 1, a plurality of metal-mesh straps 9, a plurality of fasteners 17, a main strap 20, a main fastener 23, and at least one elastic band 26, seen in FIG. 1 and FIG. 3. The rigid pad 1 cushions and supports the natural structure of at least one necklace. The rigid pad 1 is preferably covered with a cushioned layer of velvet. In order to minimize the amount of space occupied by the present invention while being able to uphold the natural structure of at least one necklace, the rigid pad 1 preferably comprises a square shape as seen in FIG. 2 and FIG. 3. The at least one necklace is cushioned by the velvet layer. The rigid pad 1 and the at least one necklace may be contained by a sleeve in order to protect the at least one necklace secured to the rigid pad 1. More specifically, the rigid pad 1 comprises a first planar surface 2 and a second planar surface 3. The plurality of metal-mesh straps 9 secures at least one necklace onto the first planar surface 2 with the plurality of fasteners 17 while preserving the natural structure of the at least one necklace. The main strap 20 positions the necklace along the first planar surface 2 with the main fastener 23. The at least one elastic band 26 secures any portion of the at least one necklace that freely rests on the second planar surface 3.

Figure 4:
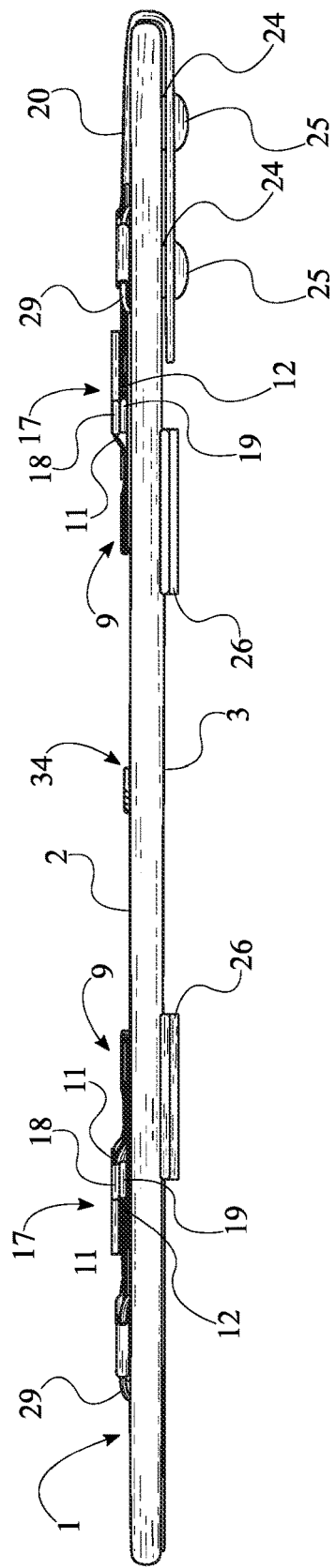
FIG. 4 is a left side view of the present invention.
Figure 5:
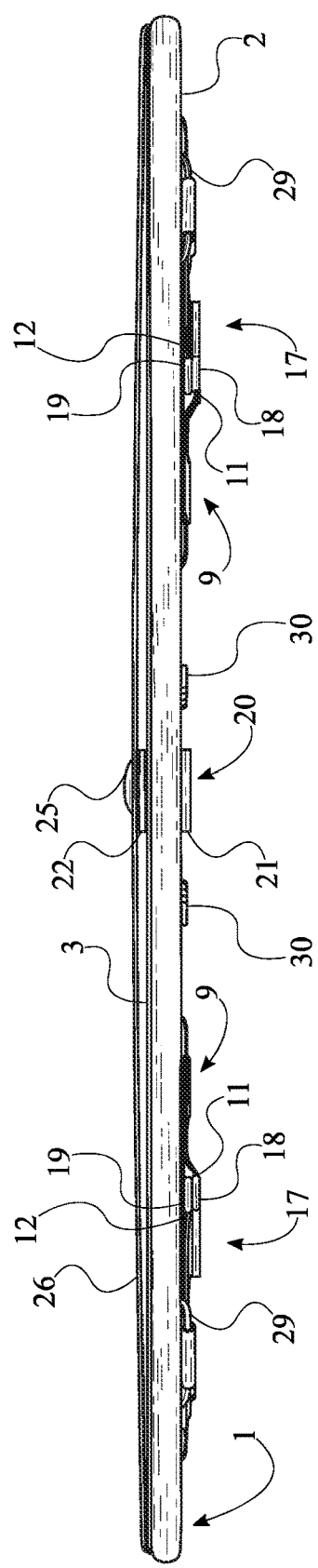
FIG. 5 is a bottom side view of the present invention.

In order to secure and contain at least one necklace while minimizing the amount of space occupied by both the rigid pad 1 and the at least one necklace, the first planar surface 2 and the second planar surface 3 are positioned opposite each other about the rigid pad 1, shown in FIG. 4 and FIG. 5. The present invention preserved the natural structure of the at least one necklace as plurality of metal-mesh straps 9 is radially distributed onto the first planar surface 2 about a central axis 10 and is coupled onto the first planar surface 2. A first end 11 of each metal-mesh strap 9 is removably attached to a second end 12 of a corresponding metal-mesh strap with a fastener of the plurality of fasteners 17. In order to position at least one necklace along the rigid pad 1, a fixed end 21 of the main strap 20 is connected to the first planar surface 2, positioned offset a first edge 4 of the rigid pad 1. In the preferred embodiment of the present invention, the fixed end 21 is centrally positioned along the first edge 4 of the rigid pad 1. A free end 22 of the main strap 20 is removably attached to the second planar surface 3 with the main fastener 23, thereby securing the desired position of the necklace on the rigid pad 1. As a portion of the at least one necklace may hang over the first edge 4 of the rigid pad 1 and rest against the second planar surface 3, the at least one elastic band 26 laterally traverses across the second planar surface 3. This arrangement allows the at least one necklace to be secured against the second planar surface 3. Moreover, a third end 27 and a fourth end 28 of the at least one elastic band 26 are fixed to the second planar surface 3, and the third end 27 is positioned opposite the fourth end 28 about the at least one elastic band 26.

Figure 2:
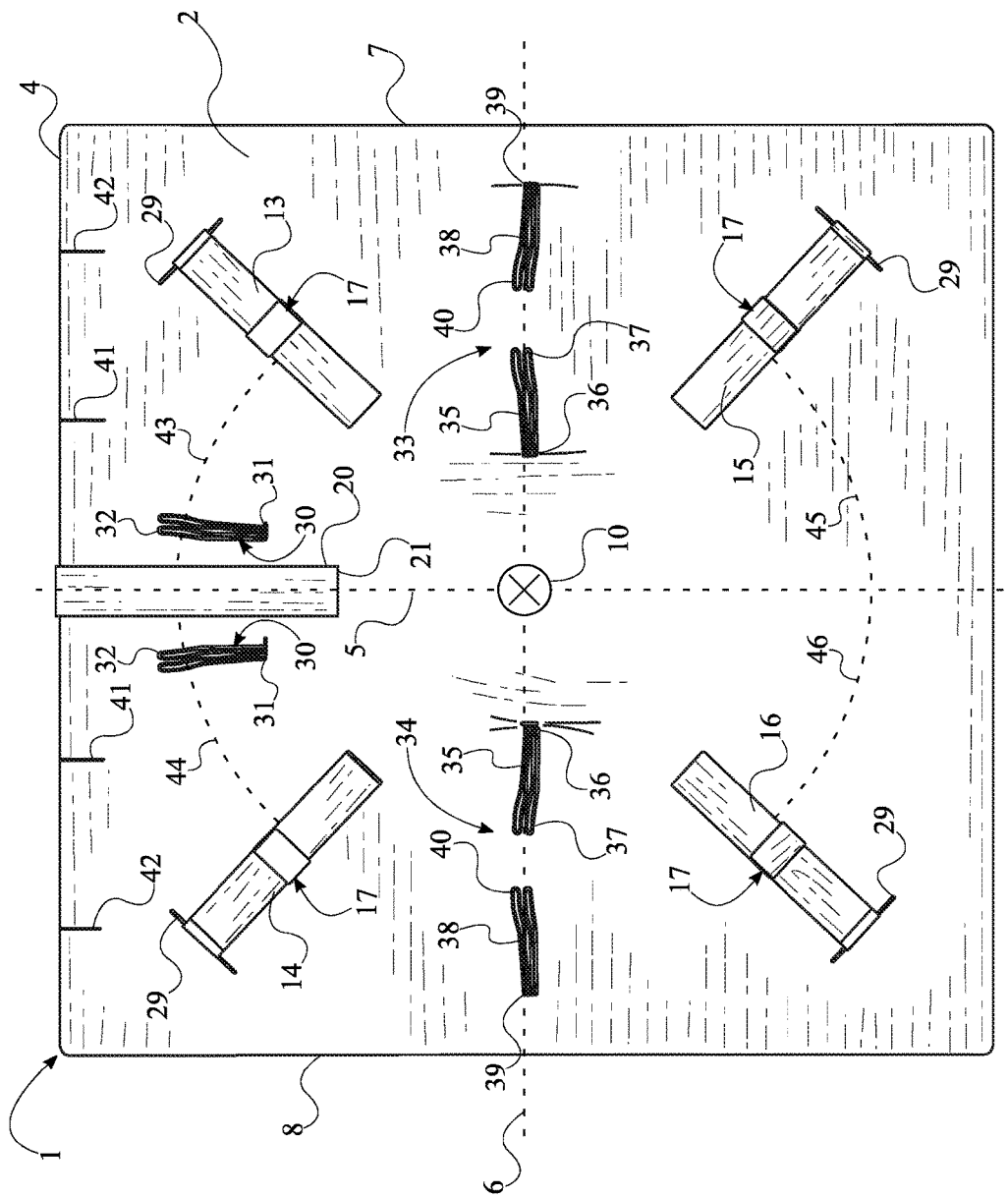
FIG. 2 is a front side view of the present invention.
Figure 3:
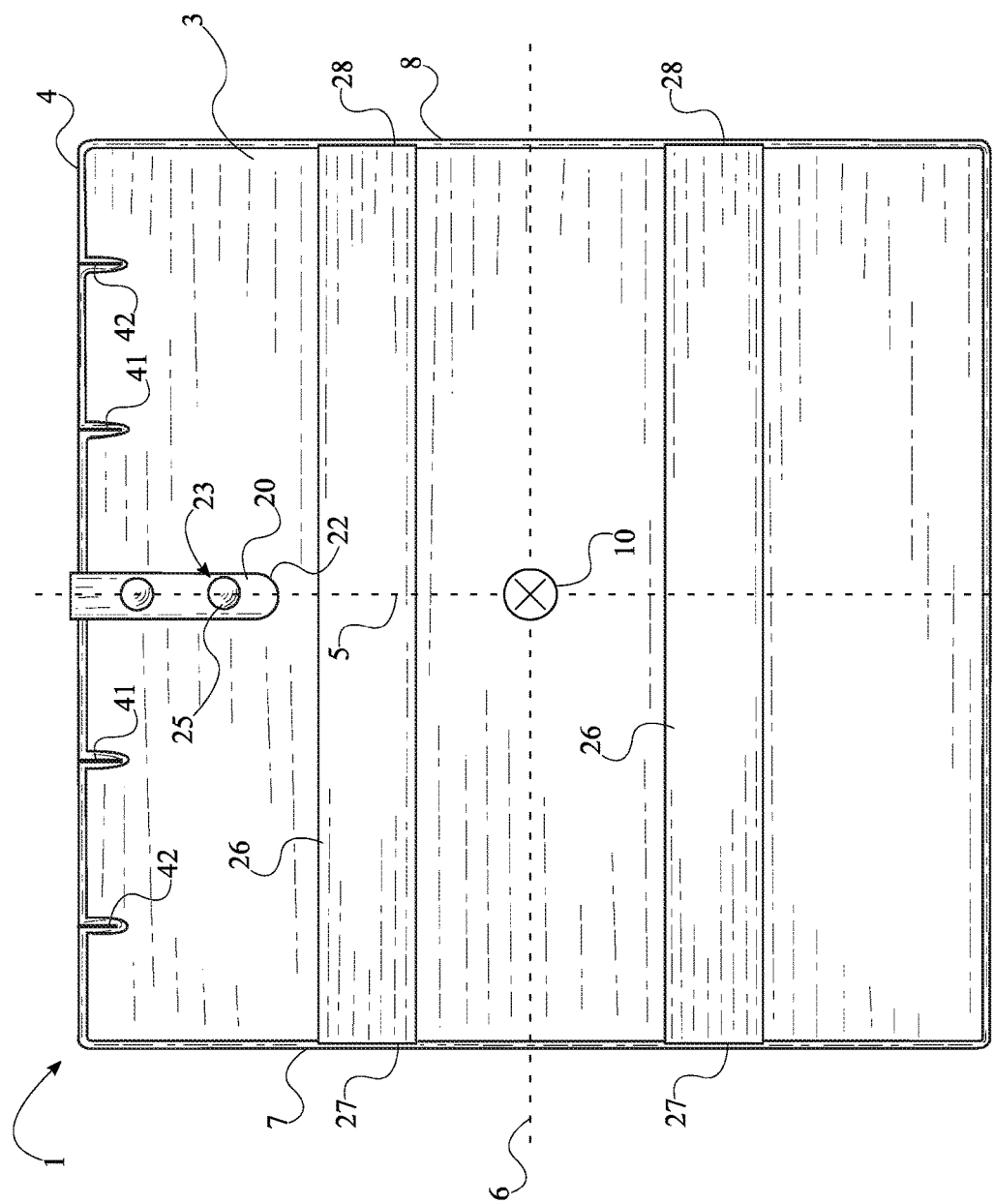
FIG. 3 is a rear side view of the present invention.

The plurality of metal-mesh straps 9 is able to accommodate necklaces of varying sizes as the present invention comprises a plurality of eyelets 29, seen in FIG. 1 and FIG. 2. The plurality of eyelets 29 connects the plurality of metal-mesh straps 9 to the rigid pad 1. Moreover, the plurality of eyelets 29 allows the plurality of metal-mesh straps 9 to be adjustable in length and thereby secure large, chunky necklaces. In order to connect the plurality of metal-mesh straps 9 with the rigid pad 1, the plurality of eyelets 29 is fixed onto the first planar surface 2 and each of the plurality of eyelets 29 is aligned with a corresponding metal-mesh strap of the plurality of metal-mesh straps 9. The plurality of metal-mesh straps 9 is able to slide while being connected to rigid pad 1 as each of the plurality of metal-mesh straps 9 is linked to a corresponding eyelet.

In the preferred embodiment of the present invention, the plurality of metal-mesh straps 9 comprises a first metal-mesh strap 13, a second metal-mesh strap 14, a third metal-mesh strap 15, and a fourth metal-mesh strap 16, seen in FIG. 2. The first metal-mesh strap 13, the second metal-mesh strap 14, the third metal-mesh strap 15, and the fourth metal-mesh strap 16 effectively wrap around the entirety of the at least one necklace. In order to accommodate the natural structure of the at least one necklace, the first metal-mesh strap 13 is oriented at an acute angle 43 from a sagittal plane 5 of the rigid pad 1. Similarly, the second metal-mesh strap 14 is oriented at an acute angle 44 from the sagittal plane 5 of the rigid pad 1, opposite the first metal-mesh strap 13. In order for entirety of the at least one necklace is secured to the rigid pad 1 so that no part of the at least one necklace accidentally gets hooked by a nearby object, the third metal-mesh strap 15 is oriented at an acute angle 45 from the sagittal plane 5, opposite the first metal-mesh strap 13 about a transverse axis 6 of the rigid pad 1. Similarly, the fourth metal-mesh strap 16 is oriented at an acute angle 46 from the sagittal plane 5, opposite the second metal-mesh strap 14 about the transverse axis 6 of the rigid pad 1.

The at least one necklace remains secured to the plurality of metal mesh-straps as each of the plurality of fasteners 17 comprises a first member 18 and a second member 19, shown in FIG. 4 and FIG. 5. Each first member 18 is connected adjacent to each first end 11 of the plurality of metal straps. Similarly, each second member 19 is connected adjacent to each second end 12 of the plurality of metal-mesh straps 9. In order to accommodate the thickness of the at least one necklace and adjust the overall length of the plurality of metal-mesh straps 9, each second member 19 is magnetically coupled to both a corresponding first member 18 and a corresponding metal-mesh strap. The overall length of the corresponding metal-mesh strap is shortened by wrapping the second member 19 with the corresponding metal-mesh strap. The portion of the corresponding metal-mesh strap that is wrapped around the second member 19 remains secure around the second member 19 because the magnetic coupling between the second member 19 and the corresponding metal-mesh strap. The at least one necklace remains secured with the plurality of metal-mesh straps 9 as the second member 19 may still connect to the first member 18 because the second member 19 is also magnetically coupled to the first member 18.

In order to secure the position of the at least one necklace along the rigid pad 1, the main fastener 23 comprises a third member 24 and a fourth member 25, shown in FIG. 4. The third member 24 is connected to the second planar surface 3 of the rigid pad 1. More specifically, the third member 24 is positioned between the first edge 4 of the rigid pad 1 and the at least one elastic band 26. The fourth member 25 is connected adjacent to the free end 22 of the main strap 20. The desired position of the at least one necklace along the rigid pad 1, as defined by the main strap 20, is secured because the fourth member 25 is removably attached to the third member 24. In the preferred embodiment of the present invention, the main fastener 23 is a snap button. More specifically, the preferred embodiment of the present invention comprises a plurality of third members in order to accommodate varying thicknesses of the at least one necklace.

In order to effectively secure and press the at least one necklace along the rigid pad 1, the main strap 20 and the main fastener 23 are centrally positioned along the first edge 4 of the rigid pad 1, as shown in FIG. 2, FIG. 3, and FIG. 5. The main strap 20 and the main fastener 23 are centrally positioned as the third member 24 is aligned with the sagittal plane 5 of the rigid pad 1. Similarly, the fixed end 21 of the main strap 20 is aligned with the sagittal plane 5 of the rigid pad 1.

The present invention ensures the entirety of the at least one necklace is pressed against first planar surface 2 of the rigid pad 1 as the present invention further comprises a couple of anchoring hooks 30, a first set of supporting hooks 33, and a second set of supporting hooks 34, seen in FIG. 1 and FIG. 2. The couple of anchoring hooks 30 secures a portion of the at least one necklace adjacent the main strap 20 and upholds the natural structure of the at least one necklace while the rigid pad 1 is vertically oriented. A fixed end 31 of each anchoring hook 30 of is connected to the first planar surface 2. A free end 32 of each anchoring hook 30 is positioned opposite the fixed end 31 of the corresponding anchoring hook 30. The natural structure of the at least one necklace is preserved as the main strap 20 is positioned in between the couple of anchoring hooks 30. Moreover, the fixed end of each anchoring hooks 30 is positioned in between the first edge 4 of the rigid pad 1 and the corresponding free end 32 of each anchoring hook 30.

The first set of supporting hooks 33 and the second set of supporting hooks 34 further secures the at least one necklace while upholding the natural structure of the at least one necklace as the first set of supporting hooks 33 and the second set of supporting hooks 34 are mounted into the first planar surface 2, shown in FIG. 1, FIG. 2, and FIG. 5. The natural structure of the at least one necklace is preserved as the first set of supporting hooks 33 is positioned in between a first arbitrary metal-mesh strap 9 and a first adjacent metal-mesh strap 9. Similarly, the second set of supporting hooks 34 is positioned in between a second arbitrary metal-mesh strap 9 and a second adjacent metal-mesh strap 9. The at least one necklace is entirely secured and pressed against the rigid pad 1 as the first set of supporting hooks 33 is positioned opposite the second set of supporting hooks 34 about the sagittal plane 5 of the rigid pad 1. More specifically, the first set of supporting hooks 33 and the second set of supporting hooks 34 is aligned with a transverse axis 6 of the rigid pad 1.

In order for the first set of supporting hooks 33 to further secure the at least one necklace while accommodating varying widths of the necklace, the first set of supporting hooks 33 comprises an inner hook 35 and an outer hook 38, also seen in FIG. 2. The inner hook 35 is positioned offset from the sagittal plane 5 of the rigid pad 1. The outer hook 38 is positioned in between the inner hook 35 and a first lateral edge 7 of the rigid pad 1. The first lateral edge 7 is positioned adjacent and oriented perpendicular of the first edge 4 of the rigid pad 1. Similar to the couple of anchoring hooks 30, a fixed end 36 of the inner hook 35 and a fixed end 39 of the outer hook 38 is mounted into the rigid pad 1. A free end 37 of the inner hook 35 is positioned opposite the fixed end 36 of the inner hook 35. Similarly, a free end 40 of the outer hook 38 is positioned opposite the fixed end 39 of the outer hook 38. The first set of supporting hooks 33 surround the width of the at least one necklace as the free end 37 of the inner hook 35 is positioned offset from the free end 40 of the outer hook 38.

In order for the second set of supporting hooks 34 to further secure the at least one necklace while accommodating varying widths of the necklace, the second set of supporting hooks 34 comprises an inner hook 35 and an outer hook 38, also seen in FIG. 2. The inner hook 35 is positioned offset from the sagittal plane 5 of the rigid pad 1. The outer hook 38 is positioned in between the inner hook 35 and a second lateral edge 8 of the rigid pad 1. The second lateral edge 8 is positioned adjacent and oriented perpendicular of the first edge 4 of the rigid pad 1. Similar to the couple of anchoring hooks 30, a fixed end 36 of the inner hook 35 and a fixed end 39 of the outer hook 38 is mounted into the rigid pad 1. A free end 37 of the inner hook 35 is positioned opposite the fixed end 36 of the inner hook 35. Similarly, a free end 40 of the outer hook 38 is positioned opposite the fixed end 39 of the outer hook 38. The first set of supporting hooks 33 surround the width of the at least one necklace as the free end 37 of the inner hook 35 is positioned offset from the free end 40 of the outer hook 38.

The present invention accommodates a wider variety of necklaces as the preferred embodiment of the present invention comprises a couple of first slots 41, seen in FIG. 1, FIG. 2, and FIG. 3. The couple of first slots 41 best accommodates necklaces that comprise thin chains. The couple of first slots 41 laterally traverse into the rigid pad 1. The couple of first slots 41 is positioned adjacent the first edge 4 of the rigid pad 1 in order for at least one necklace to be inserted into the first couple of slots. The at least one necklace is centrally positioned along the rigid pad 1 and secured with the couple of slots and the plurality of metal-mesh straps 9 as the main strap 20 is positioned in between the couple of first slots 41.

In order to accommodate more necklaces with thin chains, the present invention comprises a couple of second slots 42, also seen in FIG. 1, FIG. 2, and FIG. 3. Similar to the couple of first slots 41, the couple of second slots 42 laterally traverse into the rigid pad 1 and is positioned adjacent the first edge 4 of the rigid pad 1. In order to maintain the organization of the at least one necklaces, the main strap 20 and the couple of first slots 41 are positioned in between the couple of second slots 42.

Although the invention has been explained in relation to its preferred embodiment, it is to be understood that many other possible modifications and variations can be made without departing from the spirit and scope of the invention as hereinafter claimed.

What is claimed is:

1. A rigid jewelry display pad comprises:
   a rigid pad;
   a plurality of metal-mesh straps;
   a plurality of fasteners;
   a main strap;
   a main fastener;
   at least one elastic band;
   the rigid pad comprises a first planar surface and a second planar surface;
   the first planar surface and the second planar surface being positioned opposite each other about the rigid pad;
   the plurality of metal-mesh straps being radially distributed onto the first planar surface about a central axis;
   the plurality of metal-mesh straps being coupled to the first planar surface;
   a first end of each metal-mesh strap being removably attached to a second end of a corresponding metal-mesh strap with a fastener of the plurality of fasteners;
   a fixed end of the main strap being connected to the first planar surface, positioned offset a first edge of the rigid pad;
   a free end of the main strap being removably attached to the second planar surface with the main fastener;
   the at least one elastic band laterally traversing across the second planar surface;
   a third end and a fourth end of the at least one elastic band being fixed to the second planar surface; and
   the third end being positioned opposite the fourth end about the at least one elastic band.

2. The rigid jewelry display pad as claimed in claim 1 comprises:
   a plurality of eyelets;
   the plurality of eyelets being fixed onto the first planar surface;
   each of the plurality of eyelets being aligned with a corresponding metal-mesh strap of the plurality of metal-mesh straps; and
   each of the plurality of metal-mesh straps being linked to a corresponding eyelet.

3. The rigid jewelry display pad as claimed in claim 1 comprises:
   the plurality of metal-mesh straps comprises a first metal-mesh strap, a second metal-mesh strap, a third metal-mesh strap, and a fourth metal-mesh strap;
   the first metal-mesh strap being oriented at an acute angle from a sagittal plane of the rigid pad;
   the second metal-mesh strap being oriented at an acute angle from the sagittal plane of the rigid pad, opposite the first metal-mesh strap;
   the third metal-mesh strap being oriented at an acute angle from the sagittal plane, opposite the first metal-mesh strap about a transverse axis of the rigid pad; and
   the fourth metal-mesh strap being oriented at an acute angle from the sagittal plane, opposite the second metal-mesh strap about the transverse axis of the rigid pad.

4. The rigid jewelry display pad as claimed in claim 1 comprises:
   each of the plurality of fasteners comprises a first member and a second member;
   each first member being connected adjacent to each first end of the plurality of metal-mesh straps;
   each second member being connected adjacent to each second end of the plurality of metal-mesh straps; and
   each second member being magnetically coupled to both a corresponding first member and a corresponding metal-mesh strap.

5. The rigid jewelry display pad as claimed in claim 1 comprises:
   the main fastener comprises a third member and a fourth member;
   the third member being connected to the second planar surface of the rigid pad;
   the third member being positioned between the first edge of the rigid pad and at least one elastic band;
   the fourth member being connected adjacent to the free end of the main strap; and
   the fourth member being removably attached to the third member.

6. The rigid jewelry display pad as claimed in claim 5 comprises:
   the third member being aligned with a sagittal plane of the rigid pad; and
   the fixed end of the main strap being aligned with the sagittal plane of the rigid pad.

7. The rigid jewelry display pad as claimed in claim 1 comprises:
   a couple of anchoring hooks;
   a fixed end of each anchoring hook being connected to the first planar surface;
   a free end of each anchoring hook being positioned opposite the fixed end of the corresponding anchoring hook;
   the main strap being positioned in between the couple of anchoring hooks; and
   the fixed end of each anchoring hook being positioned in between the first edge of the rigid pad and the corresponding free end of each anchoring hook.

8. The rigid jewelry display pad as claimed in claim 1 comprises:
  a first set of supporting hooks;
  a second set of supporting hooks;
  the first set of supporting hooks and the second set of supporting hooks being mounted into the first planar surface;
  the first set of supporting hooks being positioned in between a first arbitrary metal-mesh strap and a first adjacent metal-mesh strap;
  the second set of supporting hooks being positioned in between a second arbitrary metal-mesh strap and a second adjacent metal-mesh strap; and
  the first set of supporting hooks being positioned opposite the second set of supporting hooks about a sagittal plane of the rigid pad.

9. The rigid jewelry display pad as claimed in claim 8 comprises:
  the first set of supporting hooks and the second set of supporting hooks being aligned with a transverse axis of the rigid pad.

10. The rigid jewelry display pad as claimed in claim 8 comprises:
  the first set of supporting hooks comprises an inner hook and an outer hook;
  the inner hook being positioned offset from the sagittal plane of the rigid pad;
  the outer hook being positioned in between the inner hook and a first lateral edge of the rigid pad;
  the first lateral edge being positioned adjacent and oriented perpendicular to the first edge of the rigid pad;
  a fixed end of the inner hook and a fixed end of the outer hook being mounted into the rigid pad;
  a free end of the inner hook being positioned opposite the fixed end of the inner hook;
  a free end of the outer hook being positioned opposite the fixed end of the outer hook; and
  the free end of the inner hook being positioned offset from the free end of the outer hook.

11. The rigid jewelry display pad as claimed in claim 8 comprises:
  the second set of supporting hooks comprises an inner hook and an outer hook;
  the inner hook being positioned offset from the sagittal plane of the rigid pad;
  the outer hook being positioned in between the inner hook and a second lateral edge of the rigid pad;
  the second lateral edge being positioned adjacent and oriented perpendicular to the second edge of the rigid pad;
  a fixed end of the inner hook and a fixed end of the outer hook being mounted into the rigid pad;
  a free end of the inner hook being positioned opposite the fixed end of the inner hook;
  a free end of the outer hook being positioned opposite the fixed end of the outer hook; and
  the free end of the inner hook being positioned offset from the free end of the outer hook.

12. The rigid jewelry display pad as claimed in claim 1 comprises:
  a couple of first slots;
  the couple of first slots laterally traversing into the rigid pad;
  the couple of first slots being positioned adjacent the first edge of the rigid pad; and
  the main strap being positioned in between the couple of first slots.

13. The rigid jewelry display pad as claimed in claim 11 comprises:
  a couple of second slots;
  the couple of second slots laterally traversing into the rigid pad;
  the couple of second slots being positioned adjacent the first edge of the rigid pad; and
  the main strap and the couple of first slots being positioned in between the couple of second slots.

14. The rigid jewelry display pad as claimed in claim 1 comprises:
  a couple of first slots;
  a couple of second slots;
  the couple of first slots laterally traversing into the rigid pad;
  the couple of first slots being positioned adjacent the first edge of the rigid pad;
  the main strap being positioned in between the couple of first slots;
  the couple of second slots laterally traversing into the rigid pad;
  the couple of second slots being positioned adjacent the first edge of the rigid pad; and
  the main strap and the couple of first slots being positioned in between the couple of second slots.

15. A rigid jewelry display pad comprises:
  a rigid pad;
  a plurality of metal-mesh straps;
  a plurality of fasteners;
  a main strap;
  a main fastener;
  at least one elastic band;
  the rigid pad comprises a first planar surface and a second planar surface;
  each of the plurality of fasteners comprises a first member and a second member;
  the first planar surface and the second planar surface being positioned opposite each other about the rigid pad;
  the plurality of metal-mesh straps being radially distributed onto the first planar surface about a central axis;
  the plurality of metal-mesh straps being coupled to the first planar surface;
  a first end of each metal-mesh strap being removably attached to a second end of a corresponding metal-mesh strap with a fastener of the plurality of fasteners;
  a fixed end of the main strap being connected to the first planar surface, positioned offset a first edge of the rigid pad;
  a free end of the main strap being removably attached to the second planar surface with the main fastener;
  the at least one elastic band laterally traversing across the second planar surface;
  a third end and a fourth end of the at least one elastic band being fixed to the second planar surface;
  the third end being positioned opposite the fourth end about the at least one elastic band;
  each first member being connected adjacent to each first end of the plurality of metal-mesh straps;
  each second member being connected adjacent to each second end of the plurality of metal-mesh straps; and
  each second member being magnetically coupled to both a corresponding first member and a corresponding metal-mesh strap.

16. The rigid jewelry display pad as claimed in claim 15 comprises:
  a plurality of eyelets;

the plurality of eyelets being fixed onto the first planar surface;
each of the plurality of eyelets being aligned with a corresponding metal-mesh strap of the plurality of metal-mesh straps; and
each of the plurality of metal-mesh straps being linked to a corresponding eyelet.

17. The rigid jewelry display pad as claimed in claim 15 comprises:
the plurality of metal-mesh straps comprises a first metal-mesh strap, a second metal-mesh strap, a third metal-mesh strap, and a fourth metal-mesh strap;
the first metal-mesh strap being oriented at an acute angle from a sagittal plane of the rigid pad;
the second metal-mesh strap being oriented at an acute angle from the sagittal plane of the rigid pad, opposite the first metal-mesh strap;
the third metal-mesh strap being oriented at an acute angle from the sagittal plane, opposite the first metal-mesh strap about a transverse axis of the rigid pad; and
the fourth metal-mesh strap being oriented at an acute angle from the sagittal plane, opposite the second metal-mesh strap about the transverse axis of the rigid pad.

18. The rigid jewelry display pad as claimed in claim 15 comprises:
the main fastener comprises a third member and a fourth member;
the third member being connected to the second planar surface of the rigid pad;
the third member being positioned between the first edge of the rigid pad and at least one elastic band;
the fourth member being connected adjacent to the free end of the main strap;
the fourth member being removably attached to the third member;
the third member being aligned with a sagittal plane of the rigid pad; and
the fixed end of the main strap being aligned with the sagittal plane of the rigid pad.

19. The rigid jewelry display pad as claimed in claim 15 comprises:
a couple of anchoring hooks;
a fixed end of each anchoring hook being connected to the first planar surface;
a free end of each anchoring hook being positioned opposite the fixed end of the corresponding anchoring hook;
the main strap being positioned in between the couple of anchoring hooks; and
the fixed end of each anchoring hook being positioned in between the first edge of the rigid pad and the corresponding free end of each anchoring hook.

20. The rigid jewelry display pad as claimed in claim 15 comprises:
a first set of supporting hooks;
a second set of supporting hooks;
the first set of supporting hooks comprises an inner hook and an outer hook;
the second set of supporting hooks comprises an inner hook and an outer hook;
the first set of supporting hooks and the second set of supporting hooks being mounted into the first planar surface;
the first set of supporting hooks being positioned in between a first arbitrary metal-mesh strap and a first adjacent metal-mesh strap;
the second set of supporting hooks being positioned in between a second arbitrary metal-mesh strap and a second adjacent metal-mesh strap;
the first set of supporting hooks being positioned opposite the second set of supporting hooks about a sagittal plane of the rigid pad;
the first set of supporting hooks and the second set of supporting hooks being aligned with a transverse axis of the rigid pad;
the inner hook of the first set of supporting hooks being positioned offset from the sagittal plane of the rigid pad;
the outer hook of the first set of supporting hooks being positioned in between the inner hook of the first set of supporting hooks and a first lateral edge of the rigid pad;
the first lateral edge being positioned adjacent and oriented perpendicular to the first edge of the rigid pad;
a fixed end of the inner hook for the first set of supporting hooks and a fixed end of the outer hook for the first set of supporting hooks being mounted into the rigid pad;
a free end of the inner hook for the first set of supporting hooks being positioned opposite the fixed end of the inner hook for the first set of supporting hooks;
a free end of the outer hook for the first set of supporting hooks being positioned opposite the fixed end of the outer hook for the first set of supporting hooks;
the free end of the inner hook for the first set of supporting hooks being positioned offset from the free end of the outer hook for the first set of supporting hooks;
the inner hook of the second set of supporting hooks being positioned offset from the sagittal plane of the rigid pad;
the outer hook of the second set of supporting hooks being positioned in between the inner hook of the second set of supporting hooks and a second lateral edge of the rigid pad;
the second lateral edge being positioned adjacent and oriented perpendicular to the second edge of the rigid pad;
a fixed end of the inner hook for the second set of supporting hooks and a fixed end of the outer hook for the second set of supporting hooks being mounted into the rigid pad;
a free end of the inner hook for the second set of supporting hooks being positioned opposite the fixed end of the inner hook for the second set of supporting hooks;
a free end of the outer hook for the second set of supporting hooks being positioned opposite the fixed end of the outer hook for the second set of supporting hooks; and
the free end of the inner hook for the second set of supporting hooks being positioned offset from the free end of the outer hook for the second set of supporting hooks.

* * * * *